(12) United States Patent
Watanabe et al.

(10) Patent No.: US 6,349,879 B1
(45) Date of Patent: Feb. 26, 2002

(54) POS SYSTEM, AN OPTICAL READER, AND AN INFORMATION PROCESSING SYSTEM

(75) Inventors: Mitsuo Watanabe; Hiroaki Kawai; Isao Iwaguchi, all of Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/362,705

(22) Filed: Jul. 29, 1999

(30) Foreign Application Priority Data

Feb. 2, 1999 (JP) .......................................... 11-025114

(51) Int. Cl.[7] ................................................ G06K 7/10
(52) U.S. Cl. .................................. 235/462.15; 235/383
(58) Field of Search ....................... 235/462.15, 462.13, 235/383, 472.01, 472.03, 474, 494

(56) References Cited

U.S. PATENT DOCUMENTS

| | | | | |
|---|---|---|---|---|
| 4,859,838 A | * | 8/1989 | Okiharu ....................... 235/383 |
| 4,861,972 A | | 8/1989 | Elliott et al. | |
| 4,879,456 A | | 11/1989 | Cherry et al. | |
| 4,894,522 A | * | 1/1990 | Elliott ......................... 235/472 |
| 5,172,314 A | * | 12/1992 | Poland et al. ............. 235/375 X |
| 5,335,170 A | * | 8/1994 | Petteruti et al. ......... 235/472 X |
| 5,448,046 A | * | 9/1995 | Swartz ........................ 235/383 |
| 5,473,146 A | * | 12/1995 | Goodwin, III ............... 235/383 |
| 5,537,312 A | * | 7/1996 | Sekiguchi et al. ...... 235/383 X |
| 5,721,421 A | * | 2/1998 | VanDonkelaar ............. 235/462 |
| 5,745,705 A | * | 4/1998 | Iguchi ..................... 235/383 X |
| 5,751,257 A | * | 5/1998 | Sutherland .............. 235/383 X |
| 5,777,315 A | * | 7/1998 | Wilz et al. .................. 235/472 |
| 6,161,760 A | * | 12/2000 | Marrs et al. ........... 235/462.15 |

FOREIGN PATENT DOCUMENTS

| | | | |
|---|---|---|---|
| JP | 09006853 A | * | 1/1997 |
| JP | 0925581 A | * | 10/1997 |

\* cited by examiner

*Primary Examiner*—Michael G. Lee
*Assistant Examiner*—Allyson N Sanders
(74) *Attorney, Agent, or Firm*—Armstrong, Westerman & Hattori, LLP (57) ABSTRACT

A POS system comprises a host computer providing a centralized control over a plurality of scanners, and a printer for printing a batch setting bar code or the like. A CPU of the scanner reads the changes in the setting from its own memory when it receives a first transmission request command and then transmits the data to the host computer as a first batch setting data. From this first batch setting data, a first batch setting bar code is generated. When this first batch setting bar code is read using the reader of the scanner whose setting has not been changed, the setting in the memory of this scanner is changed to the setting represented by the first batch setting data. Thus, setting in a plurality of scanners can speedily and accurately be changed.

6 Claims, 8 Drawing Sheets

POS SYSTEM, AN OPTICAL READER, AND AN INFORMATION PROCESSING SYSTEM

FIELD OF THE INVENTION

The present invention relates to a POS system having a canner for optically reading the bar code used for merchandise management and more particularly to, a POS system, an optical reader, and an information processing system for changing when setting in a plurality of scanners is to be changed, according to contents of setting in one scanner setting in the other scanners in batch.

BACKGROUND OF THE INVENTION

Recently, in retail trade, there has been used a POS system schematically comprising a plurality of POS (Points of Sales) terminals provided in each lane and a plurality of scanners connected to the plurality of POS terminals each for optically reading the bar code with the aim of speeding up a grasp of sales contents of articles as well as of saving in labor. In this POS system, each of the scanners reads the bar code attached to the article, and each of the POS terminals performs an operation for settlement according to a result of reading the bar code.

In each of the plurality of scanners, a protocol at the time of reading the bar code and conditions for the POS terminal and communication interface or the like are set respectively. When the setting in all of the plurality of scanners is to be changed (called discrete setting hereinafter), the setting in each of the scanners is required to be changed discretely. Therefore, time required for the changing the setting increases in proportion with the number of scanners. Further, a chance of an incorrect setting also increase. Therefore, shops, especially large-scaled shops where hundreds of scanners and POS terminals are installed therein eagerly desire a POS system enabling changing of settings speedily and accurately. Apart form the POS system, an optical reader for reading the bar code and an information processing system having the optical reader have a similar demand.

Figure 6:
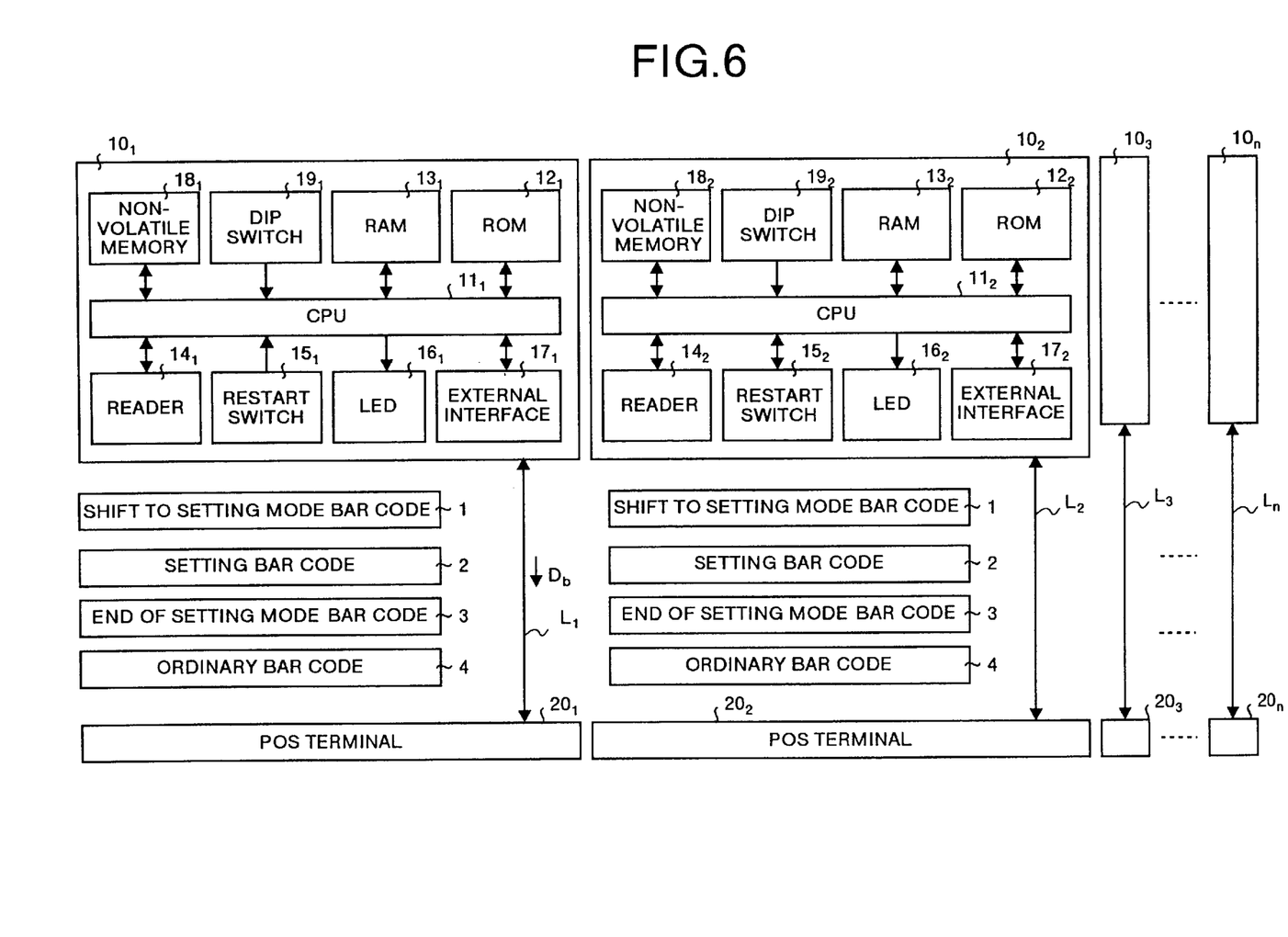
FIG. 6 is a block diagram showing configuration of the POS system based on the conventional technology.

FIG. 6 is a block diagram showing configuration of a conventional type of POS system. In this figure, scanners $10_1$ to $10_n$ are connected to POS terminal $20_1$ to $20_n$ one by one via cables $L_1$ to $l_n$ and each of the scanners optically reads the ordinary bar code 4 attached to an article (not shown) when the scanner is operated (called an operating mode hereinafter).

The ordinary bar code 4 has a pattern formed with a plurality of alternate black bars and white bars, and these patterns of bars represent the numerals from 0 to 9, and characters such as a space, #, and &. Maker code and item code for the article are also represented on the ordinary bar code 4. Herein, as the ordinary bar code 4, there are bar code symbols defined such as JAN (Japan Article Number), WPC (World Product Code) as a worldwide standard, EAN (European Article Number) used in Europe, and UPC (Universal product code) used in America.

Each of the scanners $10_1$ to $10_n$ optically reads a shift to setting mode bar code 1, setting bar code 2, end of setting mode bar code 3 at the time of discrete setting described above (called a setting mode hereinafter).

The shift to setting mode bar code 1 has control information represented with bar code for shifting the mode in each of the scanners $10_1$ to $10_n$ from the above mentioned operating mode to a setting mode.

The setting bar code 2 has setting represented with bar code for the setting mode. The setting includes a plurality of contents: selection of bar code readable from bar code specified in the WPC and JAN or the like; conditions of data transmission; conditions of generating sound when bar code is read; and parameters for various controls. As there are a plurality of settings as described above, one setting bar code 2 is used for one setting in practice. Therefore, assuming that there are 'n' number of settings, then 'n' types of setting bar codes 2 are used. The end of setting mode bar code 3 has control information represented with bar code for ending the setting mode and shifting the mode in the scanners $10_1$ to $10_n$ from the setting mode to the operating mode.

In the scanner $10_1$, a CPU (Central Processing Unit) $11_1$ provides controls over operations of reading the bar codes, changing the setting, and writing data in or reading data from a non-volatile memory $18_1$. The operation of this CPU 1 will be described in detail later. A ROM (Read Only Memory) $12_1$ stores therein a program executed by the CPU $11_1$. A RAM (Random Access Memory) $13_1$ temporarily stores therein various data required by the CPU $11_1$.

A reader $14_1$ generally comprises a laser oscillator for irradiating a laser beam on the ordinary bar code 4 or the like and a light receiving unit for receiving the light reflected from the ordinary bar code 4 or the like and then generating a read signal corresponding to distribution of black bars and white bars on the ordinary bar code 4. Furthermore, the CPU $11_1$ generates bar code data $D_b$ by demodulating the ordinary bar code 4 or the like according to the read signal, and transmits the demodulated data to the POS terminal 20, via an external interface 17, and the cable $L_1$.

A restart switch $15_1$ is used when setting is to be changed using a DIP switch $19_1$ described later. An LED (Light Emitting Diode) 16 reports the operating status of the scanner $10_1$ to the operator by light. More specifically, the LED is lit under control of the CPU $11_1$ when reading of the ordinary bar code 4 or the like is complete in the setting mode or the like.

The external interface $17_1$ works as an interfaces between the CPU $11_1$ and an external device (such as the POS terminal $20_1$). Namely, the CPU $11_1$ is connected to the POS terminal $20_1$ via the external interface 17, and the cable $L_1$.

The non-volatile memory $18_1$ is an EEPROM (Electrically Erasable and Programmable Read Only Memory) and stores the contents therein even when power supply is stopped. This non-volatile memory $18_1$ stores the above described setting for the scanner $10_1$. Furthermore, the setting stored in this non-volatile memory $18_1$ are updated during the setting mode.

Figure 7:
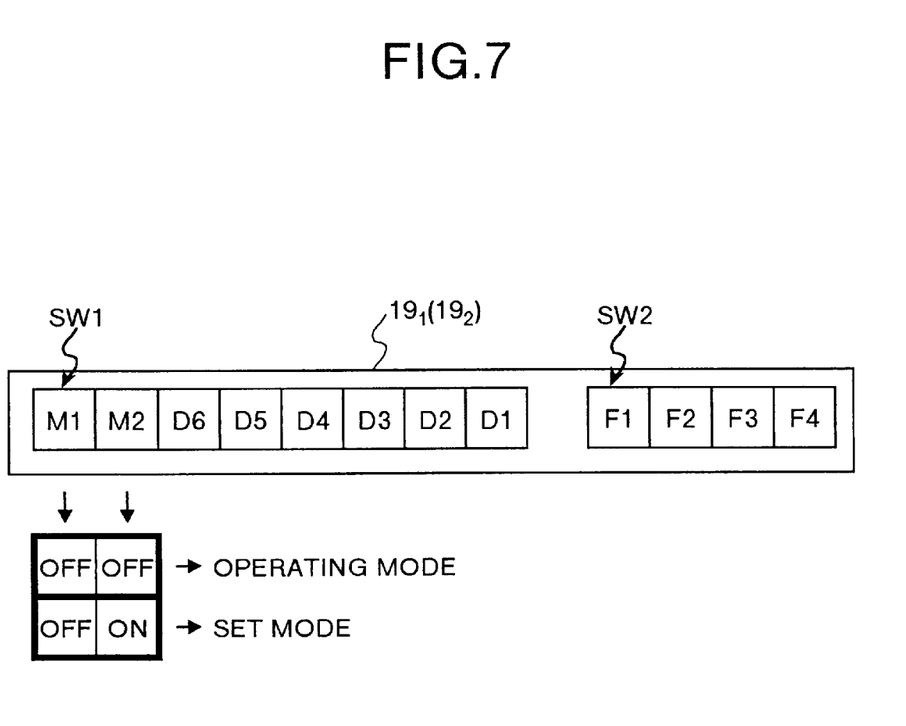
FIG. 7 is a block diagram showing configuration of the DIP switch $19_1$ (which is similar to the DIP switch $19_2$)

The DIP switch $19_1$ comprises, as shown in FIG. 7, a first switch group $SW_1$ having eight switches $D_1, D_2, D_3, D_4, D_5$s $D_6, M_2$ and $M_1$ and a second switch group $SW_2$ having four switches $F_1, F_2, F_3$, and $F_4$. This DIP switch $19_1$ is used for specifying the setting mode and setting in the scanner $10_1$ by switching each switch in the first switch group $SW_1$ and second switch group $SW_2$ ON or OFF.

Although each of the scanners $10_2$ to $11_n$ has the same configuration as that of the scanner $10_1$, different reference numerals are assigned to components in the scanner $10_2$ corresponding to those in the scanner $10_1$ for convenience in description. Namely, the scanner $10_2$ comprises a CPU $11_2$, a ROM $12_2$, a RAM $13_2$, a reader $14_2$, a restart switch $15_2$, an LED $16_2$, an external interface $17_2$, a non-volatile memory $18_2$, and a DIP switch $19_2$, and the components correspond to the components in the scanner $10_1$.

The POS terminal $20_1$ recognizes the maker and the item of the article with the ordinary bar code 4 attached thereto from the bar code data $D_b$ received from the scanner $10_1$ via the cable $L_1$, and performs an operation for settlement on the article according to the result of recognition.

Figure 8:
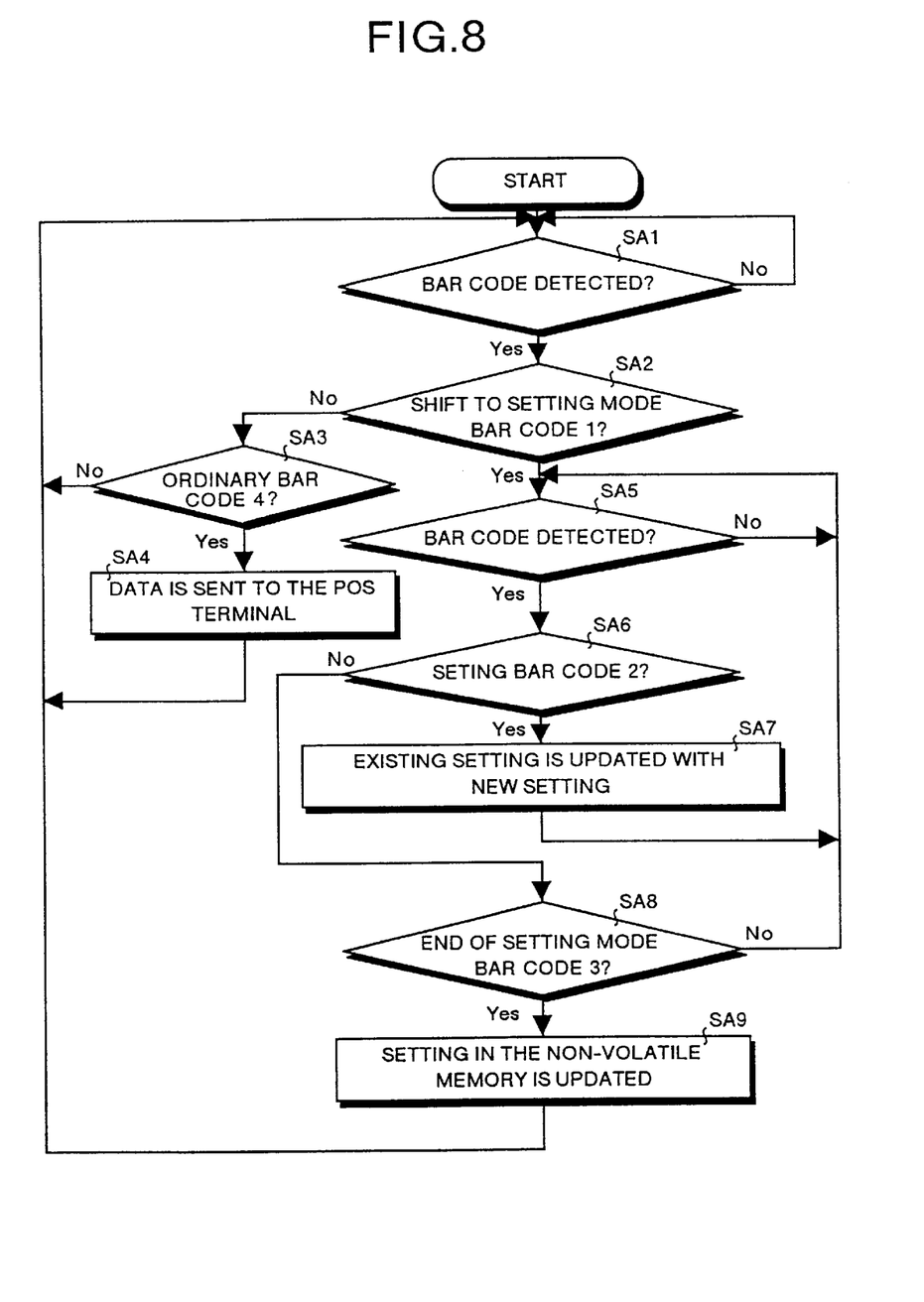
FIG. 8 is a flow chart for explaining the operation of the POS system based on the conventional technology.

Next, operation of the conventional type of POS system will be described with reference to a flow chart shown in FIG. 8. In FIG. 6, when power is supplied to each section of the device, the CPU $11_1$ of the scanner $10_1$, CPU $11_2$ of the scanner $10_2$, and each CPUs (not shown) of the scanners $10_3$ to $10_n$ shift the system control to step SA1 shown in FIG. 8. Description will be made hereinafter giving particular emphasis on the operation of the CPU 11i of the scanner $10_1$.

In step SA1, the, CPU $11_1$ of the scanner $10_1$ determines whether the reader $14_1$ has detected a bar code (ordinary bar code 4 or the like) or not according to whether a read signal has been received from the reader $14_1$ or not, and repeats the same determination when a result of detection is "No". Herein, when the ordinary bar code 4 is detected by the reader $14_1$, the CPU $11_1$ of the scanner $10_1$ recognizes a result of determination in step SA1 as "Yes" and shifts the system control to step SA2. Then, a read signal corresponding to the ordinary bar code 4 is inputted from the reader $14_1$ into the CPU $11_1$.

In step SA2, the CPU $11_1$ of the scanner $10_1$ determines from the received read signal whether the bar code detected in step SA1 is shift to setting mode bar code 1 or not. When the bar code is the ordinary bar code 4, the CPU $11_1$ of the scanner $10_1$ recognizes a result of determination in step SA2 as "No" and shifts the system control to step SA3.

In step SA3, the CPU $11_1$ of the scanner $10_1$ determines from the received read signal whether the bar code detected in step SA1 is the ordinary bar code 4 or not, and when the result of determination is "No" the system control is returned to step SA1. On the other hand, when it is determined that the detected bar code is the ordinary bar code 4, the CPU $11_1$ of the scanner $10_1$ recognizes a result of determination in step SA3 as "Yes" and shifts the system control to step SA4. In step SA4, the CPU $11_1$ of the scanner $10_1$ generates data $D_b$ for the bar code corresponding to the ordinary bar code 4 from the received read signal, transmits the data to the POS terminal $20_1$ via the external interface $17_1$ and the cable $L_1$. Then the system control is returned to step SA1 and the sequence of operations described above is repeated.

Herein, when any change occurs in specifications of the ordinary bar code 4 to be used, setting in each of the scanners $10_1$ to $10_n$ is required to be changed discretely. In this case, the operator performs a setting operation for changing the setting in order of the scanner $10_1$, $10_2$, $10_3$, . . . , $10_n$. In this setting operation, at first, the operator reads the shift to setting mode bar code 1 with the help of the reader $14_1$ in order to change the setting in the scanner $10_1$. The shift to setting mode bar code 1 is detected by the reader $14_1$, and the CPU $11_1$ of the scanner $10_1$ recognizes the result of determination in step SA1 as "Yes" and shifts the system control to step SA2. Then a read signal corresponding to the shift to setting mode bar code 1 is inputted from the reader $14_1$ into the CPU $11_1$.

In step SA2, the CPU 11, of the scanner $10_1$ determines from the received read signal whether the bar code detected in step SA1 is shift to setting mode bar code 1 or not. When it is determined that the detected bar code is shift to setting mode bar code 1, the CPU $11_1$ of the scanner $10_1$ recognizes a result of determination in step SA2 as "Yes" and shifts the system control to step SA5. With this operation, the mode in the scanner $10_1$ is shifted from the operating mode to the setting mode.

In step SA5, the CPU $11_1$ of the scanner $10_1$ determines, similarly to that in step SA1, whether the reader $14_1$ has detected bar code or not according to whether a read signal has been received from the reader $14_1$ or not, and repeats the same determination when a result of the detection is "No".

Then, the operator reads a setting bar code 2 using the reader $14_1$ in order to change the setting. One information corresponding to a new setting is represented on this setting bar code 2. The setting bar code 2 is detected herein by the reader $14_1$ so that the CPU $11_1$ of the scanner $10_1$ recognizes the result of determination in step SA5 as "Yes" and shifts the system control to step SA6. Then a read signal corresponding to the setting bar code 2 is inputted from the reader $14_1$ into the CPU $11_1$.

In step SA6, the CPU $11_1$ of the scanner $10_1$ determines from the received read signal whether the bar code detected in step SA5 is setting bar code 2 or not. Because the detected bar code is setting bar code 2, the CPU $11_1$ of the scanner $10_1$ recognizes the result of determination in step SA6 as "Yes" and shifts the system control to step SA7.

In step SA7, the CPU $11_1$ of the scanner $10_1$ reads the data for the existing setting from the non-volatile memory $18_1$ according to data demodulated from the setting bar code 2, updates this existing setting with the new setting obtained from the read signal, and returns the system control to step SA5. In step SA5, the CPU $11_1$ of the scanner $10_1$ determines whether the reader $14_1$ has detected a bar code or not, recognizes, assuming that the bar code is not detected in this case, a result of determination as "No", and repeats the same determination.

Then the operator reads the end of setting mode bar code 3 using the reader $14_1$ of the scanner $10_1$ in order to end the setting mode. The end of setting mode bar code 3 is detected by the reader $14_1$, and the CPU $11_1$ of the scanner $10_1$ recognizes the result of determination in step SA5 as "Yes" and shifts the processing to step SA6. Then a read signal corresponding to the end of setting mode bar code 3 is inputted from the reader $14_1$ into the CPU $11_1$.

In step SA6, the CPU $11_1$ of the scanner $10_1$ demodulates the bar code having been detected in step SA5 from the received read signal, and determines from the result of demodulation whether the bar code is a setting bar code 2 or not. When it is determined that the detected bar code is the setting bar code 3, the CPU $11_1$ of the scanner $10_1$ recognizes a result of determination in step SA6 as "No" and shifts the system control to step SA8. In step SA8, the CPU $11_1$ of the scanner $10_1$ determines whether the bar code detected in step SA5 is end of setting mode bar code 3 or not from the received read signal. When the result of determination in step SA8 is "Not", the system control is returned to step SA5 and the sequence of operations described above is repeated.

Because the bar code detected in step SA5 is the end of setting mode bar code 3, the CPU $11_1$ of the scanner $10_1$ recognizes the result of determination in step SA8 as "Yes" and shifts the system control to step SA9. With this operation, the mode in the scanner $10_1$ is shifted from the setting mode to the operating mode. In step SA9, the CPU $11_1$ of the scanner $10_1$ updates the setting in the non-volatile memory $18_1$ with the new setting according to an updating operation in step SA7. Then the system control is returned to step SA1 and the sequence of operations described above is repeated.

When the setting in the scanner $10_1$ are changed, the operator performs the same operation as that for setting in the scanner $10_1$ to change the setting in the next scanner, i.e. the scanner $10_2$. Similarly, when the setting in the scanner $10_2$ are changed, the operator successively performs the same operation as that for setting in the scanner $10_1$ to change the setting in each of the scanners from scanner $10_3$ to $10_n$.

Although description has been made for the case, in the setting mode, where setting are changed using the shift to setting mode bar code 1, setting bar code 2, and the end of setting mode bar code 3, it is also possible to change the setting using the DIP switch. When setting in the scanner $10_1$ is changed using the DIP switch $19_1$, as one example, the operator switches OFF the switch $M_1$ and switches ON the switch $M_2$ in the first switch group $SW_1$ of the DIP switch $19_1$ shown in FIG. 7 and turns ON the power. Then, the operator presses the restart switch $15_1$. With this operation, the mode in the scanner $10_1$ is changed to the setting mode, and the CPU $11_1$ of the scanner $10_1$ recognizes that the mode in the scanner $10_1$ is switched from the operating mode to the setting mode.

Then, the operator changes the ON/OFF state of, for instance, each of the switches $F_1$ to $F_4$ in the second switch group $SW_2$ of the DIP switch $19_1$ to change the setting in the scanner $10_1$. With this operation, the CPU $11_1$ of the scanner $10_1$ recognizes the ON/OFF state of the second switch group $SW_2$ to grasp contents of the new setting.

Then, the CPU $11_1$ of the scanner $10_1$ reads the data for the existing setting from the non-volatile memory $18_1$ in the same manner as in step SA7 (Refer to FIG. 8), and updates the existing setting when the restart switch $15_1$ is continuously pressed for more than 30 ms in a row with the new setting according to the second switch group $SW_2$. The configuration of the POS system described above may be applied to an optical reader for optically reading bar code and to an information processing system having a function for reading the bar code in, for example, physical distribution.

By the way, in the conventional type of POS system, when it is required to change the setting in the scanner $10_1$ to $10_n$, a series of operations for changing the setting such as the operation of reading a shift to setting mode bar code 1, the operation of reading one or more setting bar code 2, the operation of reading a end of setting mode bar code 3 has to be repeated 'n' times.

In such a case, although there occurs no problem when the number 'n' of the scanners $10_1$ to $10_n$ is a small number. However, a long time is required for this operation when the number 'n' is in the order of a few hundred from the fact that bar codes are read at least three times for each unit, which causes an error in an reading order to occur and also incorrect setting to occur. Especially, when the setting are changed using the DIP switch $19_1$, still longer time is required for ON/OFF setting of the DIP switch $19_1$, therefore, the problem becomes more severe as compared to the case where the shift to setting mode bar code 1 is used.

Furthermore, when the setting are changed using the DIP switch $19_1$, the ON/OFF setting of the DIP switch $19_1$ has to be performed for each switch in the DIP switch $19_1$ as well as for each unit thereof, therefore, the problem such as the incorrect setting becomes more severe as compared to the case where the above mentioned shift to setting mode bar code 1 is used. Similar problems occurs in the conventional type of optical reader and information processing system as the POS system.

SUMMARY OF THE INVENTION

The present invention has been made with the background described above, and it is an object of the present invention to provide a POS system, an optical reader, and an information processing system in which the setting in a plurality of scanners can speedily and accurately be changed.

The POS system according to the present invention comprises a plurality of scanners each having a reader for optically reading a bar code, a memory for storing therein data for setting required for operations, and a control unit for controlling the operation of writing data in or reading data from the memory. There is provided a discrete setting changing unit for changing the data for setting in the memory in one of the plurality of scanners. A bar code generating unit is provided for generating a batch setting bar code according to the data for setting after changes in the memory in the scanner whose data for setting has been changed. The control unit in each of the scanners other than the scanner whose data for setting has been changed, changes the data for setting in its own memory according to the data for setting after changes obtained from the batch setting bar code read by the reader of the respective scanners.

Thus, data for setting in the memory in one of the plurality of scanners is changed using the discrete setting changing unit, then, data for setting in the other scanners is not complete is changed in batch.

In other words, the reader of each of the other scanners reads the generated batch setting bar code and the control unit of these scanners updates the data for setting in their own memory according to the data for setting after changes obtained from the batch setting bar code.

With the above invention, data for setting in one of the scanners is discretely changed and then each data for setting in the other scanners is changed in batch using the only one batch setting bar code. Therefore, setting can speedily be changed as compared to that of the conventional type of POS system, and the chances of incorrect setting can be prevented because there is no need to discretely change the setting, especially, in a plurality of scanners using a DIP switch or the like, which allows the changing operation of setting to accurately be performed.

In the POS system according to another aspect, the bar code generating unit comprises a read control unit and a bar code generator. The read control unit issues an instruction to read the data for setting after changes from the memory with respect to the control unit of the scanner whose data for setting has been changed. The bar code generator generates the batch setting bar code according to the data for setting after changes read by the control unit of the scanner whose data for setting has been changed.

When an instruction to read the data for setting after changes from the memory is issued by the read control unit, the data for setting after changes is read out by the control unit. Then the bar code generator generates the batch setting bar code according to this data for setting after changes.

With the above invention, data for setting in one of the scanners is discretely changed and then each data for setting in the other scanners is changed in batch using the only one batch setting bar code. Therefore, setting can speedily be changed as compared to that of the conventional type of POS system, and chances of incorrect setting can be prevented because there is no need to discretely change the setting, especially, in a plurality of scanners using a DIP switch or the like, which allows the changing operation of setting to accurately be performed.

In the POS system according to another aspect, the control unit of the scanner whose data for setting has been changed reads the data for setting after changes from the memory according to a result of reading a specified bar code with the reader. Then, the bar code generating unit generates the batch setting bar code according to the data for setting after changes.

When a specified bar code is read by the reader of one of the scanners, the control unit of that scanner reads the data for setting after changes from the memory. Then, the bar code generating unit generates the batch setting bar code according to the data for setting after changes.

With the above invention, because an extremely simple method of having the reader read a specified bar code is used, setting can more speedily be changed as compared to that of the conventional type of POS system.

The POS system according to another aspect comprises a plurality of scanners each having a reader for optically reading a bar code, a memory for storing therein data for setting required for operations, and a control unit for controlling the operation of writing data in or reading data from the memory. There is provided a discrete setting changing unit for changing the data for setting in the memory in one of the plurality of scanners. A bar code generating unit compares the data for setting before changes in the memory of the scanner whose data for setting has been changed to the data for setting after changes and generates a batch setting bar code according to only the changed portions of the data. The control unit in each of the scanners other than the scanner whose data for setting has been changed, changes only the changed portions of the data for setting stored therein according to data for the changed portions obtained from the batch setting bar code read by the reader of the respective scanners.

Thus, data for setting before the changes in the scanner whose data has been changed is compared with the data for setting after changes, and the batch setting bar code is generated according to only the different portions.

With the above invention, as only the portion of data which is different is read, the time for reading the batch setting bar code with the help of the reader of the other scanners is reduced. This allows the setting to still more speedily be changed as compared to that of the conventional type of POS system.

The POS system according to another aspect comprises a plurality of scanners each having a reader for optically reading a bar code, a memory for storing therein data for setting required for operations, and a control unit for controlling the operation of writing data in or reading data from the memory. There is provided a discrete setting changing unit for changing the data for setting in the memory in one of the plurality of scanners. A bar code generating unit for generates a batch setting bar code according to the data for setting after changes in the memory in the scanner whose data for setting has been changed. The control unit in each of the scanners other than the scanner whose data for setting has been changed, changes the data for setting stored in the memory according to the data for setting after changes obtained from the batch setting bar code read by the reader of the respective scanners.

Thus, the discrete setting changing unit first changes the data for setting in the memory in one of the plurality of scanners. Then, when the batch setting bar code is read using the reader of the other scanners, setting in the other scanners is successively changed in batch.

In other words, when the batch setting bar code is read by the reader of each of the other scanners, the control unit updates data for setting in their own memory according to the data for setting after changes obtained from the batch setting bar code.

With the above invention, data for setting in one of scanners is discretely changed and then each data for setting in the other scanners is changed in batch using the same batch setting bar code. Therefore, setting can speedily be changed as compared to that of the conventional type of POS system, and chances of incorrect setting can be prevented because there is no need to discretely change the setting, especially, in a plurality of scanners using a DIP switch or the like, which allows the setting to accurately be changed.

The POS system according to another aspect comprises a plurality of scanners each having a reader for optically reading bar code, a memory for storing therein data for setting required for operations, and a control unit for controlling the operation of writing data in or reading data from the memory. There is provided a discrete setting changing unit for changing the data for setting in the memory in one of the plurality of scanners. A bar code generating unit generates a batch setting bar code according to the data for setting after changes in the memory in the scanner whose data for setting has been changed. A switch is provided for shifting the operating mode of the scanners other than the scanner whose data for setting has been changed to a batch setting mode. The control unit in each of the scanners other than the scanner whose data for setting has bee changed, shifts the mode to the batch setting mode under control by the switch and changes the data for setting in the memory according to the data for setting after changes obtained from the batch setting bar code read by the reader of the respective scanners.

Thus, the discrete setting changing unit first changes the data for setting in the memory in one of plurality of scanners. Then, when the operating mode is shifted to a batch setting mode using the switch and batch setting bar code is read by the reader of each of the other scanners, setting in these scanners in which changing of setting is not complete is successively changed in batch.

When the batch setting bar code is read by the reader of each of the other scanners, the control unit updates data for setting in its own memory according to the changed data for setting obtained from the batch setting bar code.

With the above invention, data for setting in one of scanners is discretely changed and then data for setting in each of the other scanners is changed in batch using the same batch setting bar code. Therefore, setting can speedily be changed as compared to that of the conventional type of POS system, and chances of incorrect setting can be prevented because there is no need to discretely change the setting, especially, in a plurality of scanners using a DIP switch or the like, which allows the setting to accurately be changed.

The optical reader according to the present invention comprises a reader for optically reading a bar code; a memory for storing therein data for setting required for operations; a control unit for controlling the operations of writing data in or reading data from the memory. An interface is provided for performing communications with an external device. The control unit writes the data for setting inputted from the outside in the memory and also sends out the data for setting set in the memory via the interface to the external device.

When the data for setting is inputted from outside, the control unit writes the data for setting in the memory and also sends out data for setting in the memory via the external interface to the external device. Because the data for setting in the memory can be sent out to the external device, the external device can easily change setting in the memories of the other scanners in batch using the received data for setting.

In the optical reader according to another aspect the control unit sends out only data for setting set anew via the interface to the external device.

With the above invention, because only the data for setting set anew is sent out via the interface to the external device by the control unit, amount of data for setting in the memories of the other scanners to be sent from the external device becomes smaller, which allows the setting to speedily be changed.

The information processing system according to the present invention comprises a plurality of scanners each having a reader for optically reading a bar code, a memory for storing therein data for setting required for operations, and a control unit for controlling the operation of writing data for setting in or reading the data for setting from the memory. An upper device is connected to the plurality of scanners. This upper device has a receiving unit for receiving the data for setting set in one of the plurality of scanners, a bar code generating unit for generating a batch setting bar code for updating the data for setting for the other scanners in batch according to the received data for setting, and can update data for setting of the scanner in batch by having the batch setting bar code read with the scanner.

With the above invention, when the receiving unit of the upper device receives data for setting set in one of the scanners, the bar code generating unit generates the batch setting bar code. Then, by having this batch setting bar code read with the reader of the scanner, data for setting in the memory in the scanner is updated in batch. Because the data for setting in other scanners can be updated in batch using batch setting bar code, the setting can speedily and accurately be changed.

Other objects and features of this invention will become apparent from the following description with reference to the accompanying drawings.

DESCRIPTION OF THE PREFERRED EMBODIMENTS

Detailed description is made hereinafter for one embodiment of the POS system, optical reader, and information processing system according to the present invention with reference to the attached drawings.

Figure 1:
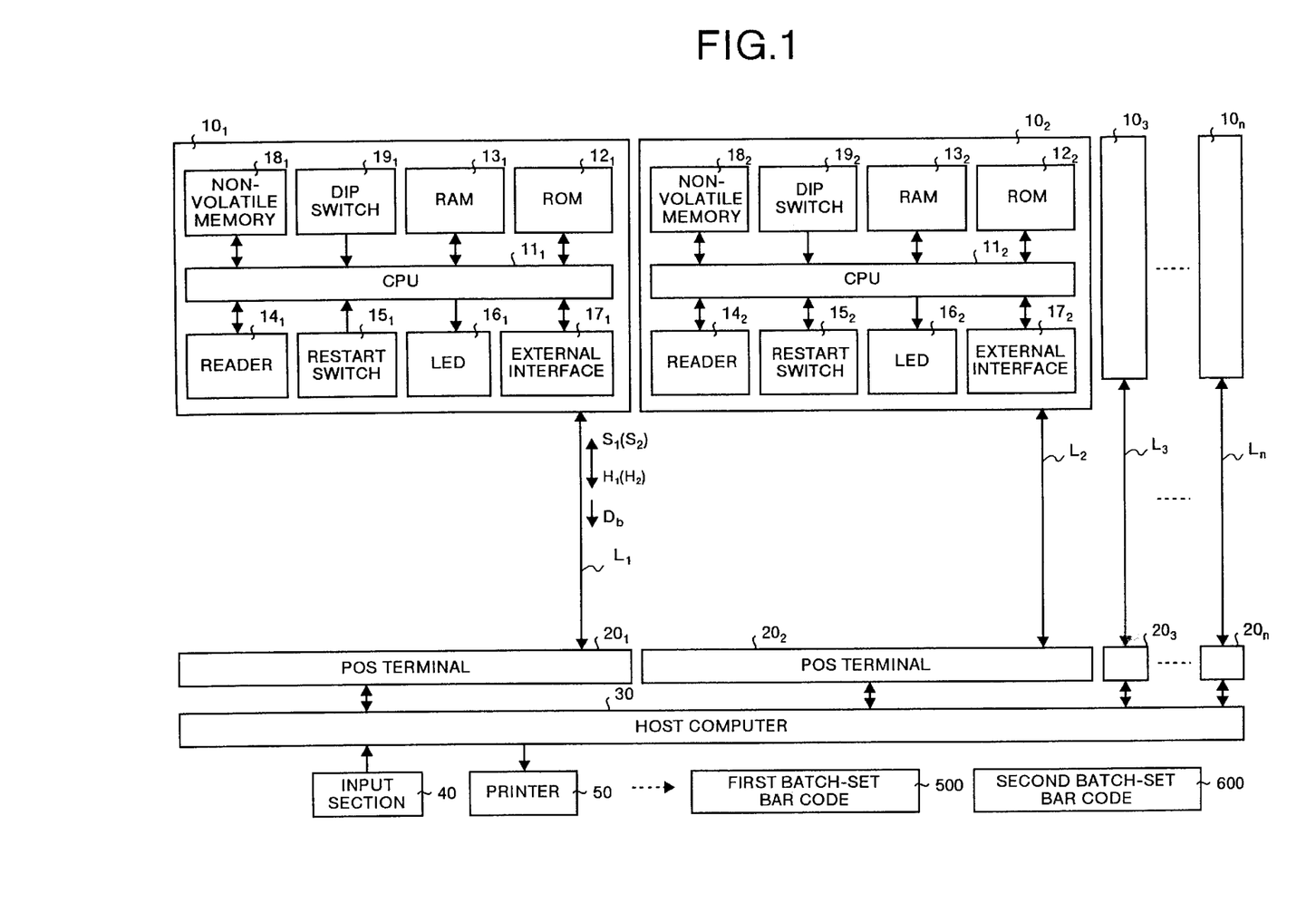
FIG. 1 is a block diagram showing the configuration of the POS system according to one embodiment of the present invention.

FIG. 1 is a block diagram showing configuration of a POS system according to one embodiment of the present invention. In this figure, the same reference numerals are assigned to components corresponding to those in FIG. 6, and description thereof is omitted herein.

Figure 2:
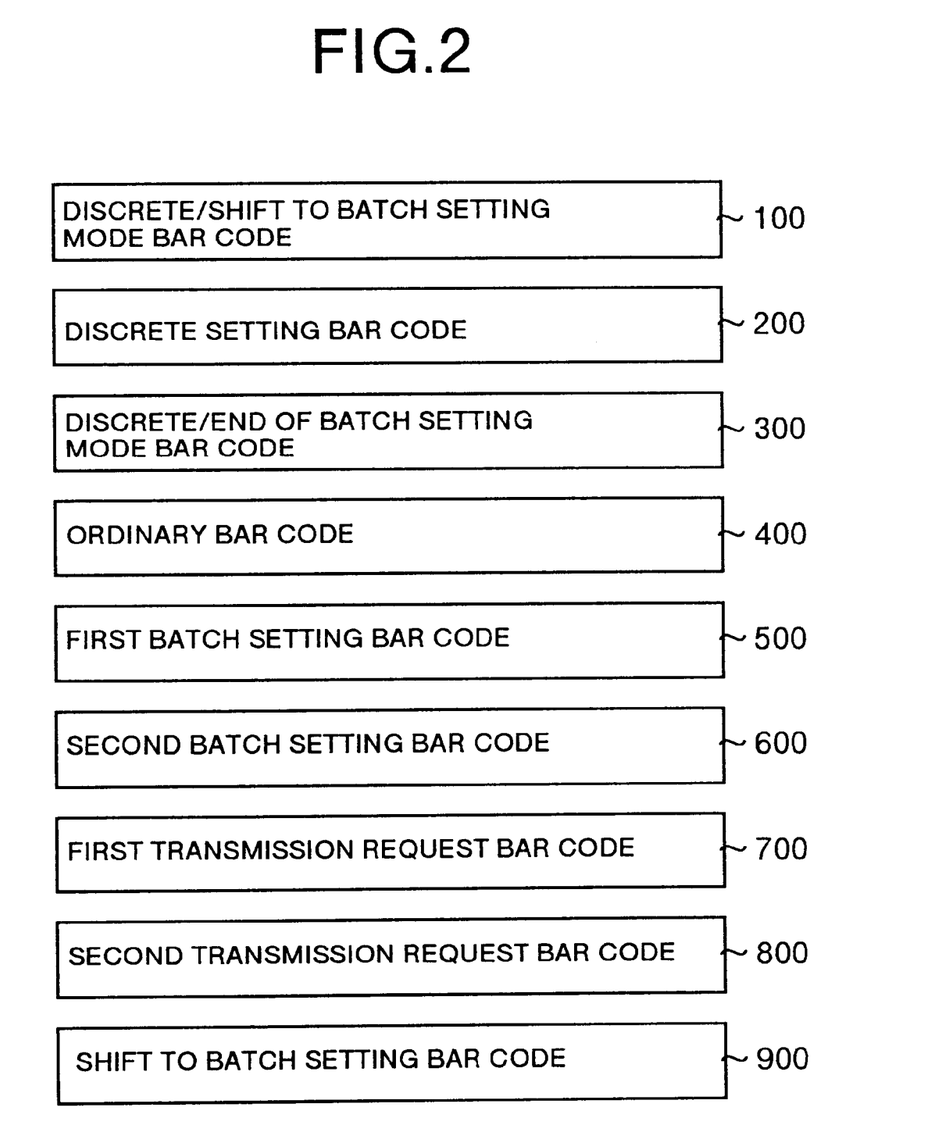
FIG. 2 is a view showing various types of bar codes used in the POS system according to one embodiment.

In the POS system shown in FIG. 1, various types of bar codes shown in FIG. 2 are used instead of the shift to setting mode bar code 1, the setting bar code 2, the end of setting mode bar code 3, and the ordinary bar code 4 shown in FIG. 6. Namely, in FIG. 2, discrete/shift to batch setting mode bar code 100 is the one obtained by converting to bar code the information for shifting a mode in the scanners $10_1$ to $10_n$ from the above mentioned operating mode to a discrete/batch setting mode. The discrete/batch setting mode is a mode for discretely setting contents of setting in a memory such as a non-volatile memory $18_1$ using a plurality of discrete setting bar code 200 described later as well as a mode for setting in batch the setting in, for example, the non-volatile memories $18_2$ to $18_n$ using a first batch setting bar code 500 (or a second batch setting bar code 600) described later.

The discrete setting bar code 200 has the same function as the above mentioned setting bar code 2 (Refer to FIG. 6), and it corresponds to one setting out of all the settings in the non-volatile memory 18w. Therefore, if there are 'n' number of settings, then 'n' types of discrete setting bar code 200 are used in practice. The first batch setting bar code 500 is obtained by converting to bar code the information for contents of setting re-set in a memory such as the non-volatile memory $18_1$ using the discrete setting bar code 200.

The second batch setting bar code 600 is obtained by converting to bar code the information for a changed portion in contents of setting re-set in, for example, the non-volatile memory $18_1$ using the discrete setting bar code 200. Discrete/end of batch setting mode bar code 300 is obtained by converting to bar code the information for shifting a mode in the scanners $10_1$ to $10_n$ from the above mentioned discrete/batch setting mode to the operating mode. The ordinary bar code 400 has the same function as the ordinary bar code 4 (Refer to FIG. 6), and is obtained by converting to bar code the maker code and item code for an article.

A first transmission request bar code 700 is obtained by converting to bar code the information for requesting to transmit data of setting after changes stored in, for example, the non-volatile memory $18_1$ in the scanner $10_1$. On the other hand, a second transmission request bar code 800 is obtained by converting to bar code the information for shifting a mode transmit data for a changed portion in contents of setting before change in the scanner $10_1$. A shift to batch setting mode bar code 900 is obtained by converting to bar code the information for shifting a mode in the scanners $10_1$ to $10_n$ from the operating mode to the batch setting mode. The batch setting mode is a mode for setting in batch the setting in, for example, the non-volatile memories $18_1$ to $18_n$ using the first batch setting bar code 500 (or the second batch setting bar code 600) described later.

Namely, in the POS system according to one embodiment, the setting in the non-volatile memory in each of the scanners $10_2$ to $10_n$ is changed in batch using the first batch setting bar code 500 (or the second batch setting bar code 600) prepared according to the contents of setting discretely set in, for example, the non-volatile memory $18_1$ in the scanner $10_1$ using (a plurality) discrete setting bar code 200. The above mentioned batch setting can be performed by using either one of the discrete/shift to batch setting mode bar code 100 and the shift to batch setting mode bar code 900. Therefore, it is up to a user to decide which. of the discrete/shift to batch setting mode bar code 100 and the shift to batch setting mode bar code 900 is to be selected at the time of batch setting.

In FIG. 1, a host computer 30, an input section 40, and a printer 50 are provided anew. Furthermore, the function of the CPU $11_1$ (Refer to FIG. 1) in the POS system according to one embodiment is different from the function of the CPU $11_1$ shown in FIG. 6. The function of the CPU $11_1$ (Refer to FIG. 1) will be described in detail later.

The host computer 30 shown in FIG. 1 is an upper computer connected to the POS terminals $20_1$ to $20_n$ for collecting various data from the POS terminals $20_1$ to $20_n$ and providing centralized controls over the scanners $10_1$ to $10_n$ as well as the POS terminals $20_1$ to $20_n$. The scanners $10_1$ to $10_n$ are connected to the POS terminals $20_1$ to $20_n$ through the cables $L_1$ to $L_n$ respectively.

The host computer 30 transmits a first transmission request command $S_1$ and a second transmission request command $S_2$ received from the input section 40 such as a keyboard to the CPU $11_1$ of the scanner $10_1$ via the POS terminal $20_1$, the cable $L_1$, and the external interface $17_1$. It should be noted that the host computer 30 can also transmit the first transmission request command $S_1$ and second transmission request command $S_2$ to the other scanners $10_2$ to $10_n$. Herein, the first transmission request command $S_1$ is a command to request that changed data for contents of setting stored in the non-volatile memory $18_1$ of the scanner $10_1$ is to be transmitted. On the other hand, the second transmission request command $S_2$ is a command to request that data for a changed portion in contents of setting before change is to be transmitted.

The printer 50 prints the first batch setting bar code 500 (Refer to FIG. 2) on a label not shown according to a first batch setting data $H_1$ transmitted from the CPU $11_1$ in response to the first transmission request command $S_1$ under control of the host computer 30. Herein, the first batch setting data $H_1$ is the data for setting after changes stored in the non-volatile memory $18_1$ of the scanner $10_1$ in the discrete setting mode of the scanner $10_1$.

Furthermore, the printer 50 prints the second batch setting bar code 600 (Refer to FIG. 2) on a label not shown according to a second batch setting data $H_2$ transmitted from the CPU $11_1$ in response to the second transmission request command $S_2$ under control of the host computer 30. Herein, the second batch setting data $H_2$ is the data representing a portion of changes in the with respect to the setting before changes stored in the non-volatile memory $18_1$ of the scanner $10_1$ in the discrete setting mode of the scanner $10_1$.

Next, operation of the POS system according to one embodiment will be described with reference to flow charts shown in FIG. 3 to FIG. 5. Each of the above mentioned operating mode, discrete/batch setting mode, and batch setting mode will be described hereinafter.

(Operating Mode)

At first, description is made for the operations in the operating mode. In the operating mode, the ordinary bar code 400 shown in FIG. 2 is used, and the scanners $10_1$ to $10_n$ operate according to the of setting described above stored in each of the non-volatile memories $18_1$ to $18_n$ respectively. In FIG. 1, when power is supplied to each sections of the device, the CPU $11_1$ of the scanner $10_1$, CPU $11_2$ of the scanner $10_2$, and each CPU (not shown) of the scanners $10_3$ to $10_n$ shift the system control to step SB1 shown in FIG. 3. Description below will be made giving a particular emphasis on the operation of the CPU $11_1$ of the scanner $10_1$.

In step SB1, the CPU $11_1$ of the scanner $10_1$ determines whether the reader $14_1$ has detected a bar code (ordinary bar code 400 or the like) or not according to whether a read signal has been received from the reader $14_1$ or not. Herein, when the ordinary bar code 400 is detected by the reader $14_1$, the CPU $11_1$ of the scanner $10_1$ recognizes a result of determination in step SB1 as "Yes" and shifts the system control to step SB2. Then, a read signal corresponding to ordinary bar code 400 is inputted from the reader $14_1$ into the CPU $11_1$.

In step SB2, the CPU $11_1$ of the scanner $10_1$ demodulates the bar code from the received read signal, and determines whether the bar code detected in step SB1 is a discrete/shift to batch setting mode bar code 100 or not. In this case, as the detected bar code is the ordinary bar code 400, the CPU $11_1$ of the scanner $10_1$ recognizes the result of determination in step SB2 as "No" and shifts the system control to step SB4.

In step SB4, the CPU $11_1$ of the scanner $10_1$ determines whether the bar code detected in step SB1 is the shift to batch setting mode bar code 900 or not. In this case, as the detected bar code is the ordinary bar code 400, the CPU $11_1$ of the scanner $10_1$ recognizes the result of determination in step SB4 as "No" and shifts the system control to step SB6.

In step SB6, the CPU $11_1$ of the scanner $10_1$ determines whether the bar code detected in step SB1 is the first transmission request bar code 700 or not. In this case, as the detected bar code is the ordinary bar code 400, the CPU $11_1$ of the scanner $10_1$ recognizes the result of determination in step SB6 as "No" and shifts the system control to step SB9.

In step SB9, the CPU $11_1$ determines whether the bar code detected in step SB1 is the second transmission request bar code 800 or not. In this case, as the detected bar code is the ordinary bar code 400, the CPU $11_1$ recognizes the result of determination in step SB9 as "No" and shifts the system control to step SB12.

In step SB12, the CPU $11_1$ of the scanner $10_1$ determines whether the bar code detected in step SB1 is the ordinary bar code 400 or not. When the result of determination is "No", the system control is returned to step SB1. In this case, as the ordinary bar code 400 has been detected, the CPU $11_1$ recognizes the result of determination in step SB12 as "Yes" and shifts the system control to step SB13. In step SB13, the CPU $11_1$ of the scanner $10_1$ generates data $D_b$ for the bar code corresponding to the ordinary bar code 4, transmits the data to the POS terminal $20_1$ via the external interface $17_1$ and the cable $L_1$. Then the system control is returned to step SB1 and the sequence of operations described above is repeated.

It should be noted that each operation of the scanners $10_2$ to $10_n$ as well as of the POS terminals $20_2$ to $20_n$ is the same as that of the above mentioned scanner $10_1$ and the POS terminal $20_1$, therefore, detailed description thereof is omitted therein.

(Discrete/Batch Setting Mode)

Operation in a discrete/batch setting mode will be described. At first, description is made for a discrete setting mode of the discrete/batch setting mode, for discretely changing the setting in the non-volatile memory $18_1$ of the scanner $10_1$. In the discrete setting mode, the discrete/shift to batch setting mode bar code 100, one or more of the discrete setting bar code 200, and the discrete/end of batch setting mode bar code 300 each shown in FIG. 2 are used.

During the operating mode explained above, for instance, when specifications of the ordinary bar code 400 to be used are changed, each setting in the scanners $10_1$ to $10_n$ has to be change. In this case, the operator performs an operation of reading the discrete/shift to batch setting mode bar code 100 by the reader $14_1$ of the scanner $10_1$. When the reader $14_1$ detects the discrete/shift to batch setting mode bar code 100, the CPU $11_1$ of the scanner $10_1$ recognizes the result of determination in step SB1 as "Yes" and shifts the system control to step SB2. Furthermore, a read signal corresponding to the discrete/shift to batch setting mode bar code 100 is inputted from the reader $14_1$ to the CPU $11_1$.

In step SB2, the CPU $11_1$ of the scanner $10_1$ demodulates the bar code from the received read signal, and determines whether the bar code detected in step SB1 is the discrete/shift to batch setting mode bar code 100 or not. In this case, as the detected bar code is the discrete/shift to batch setting mode bar code 100, the CPU $11_1$ of the scanner $10_1$ recognizes the result of determination in step SB2 as "Yes" and shifts the system control to step SB3. With this, the mode in the scanner $10_1$ is shifted from the operating mode to the discrete/batch setting mode.

Description is made hereinafter for details of discrete/batch setting processing in step SB3 described above while referring to the flow chart shown in FIG. 4. In step SC1 shown in FIG. 4, the CPU $11_1$ of the scanner $10_1$ determines, in the same manner as the step SB1 (Refer to FIG. 2), whether the reader $14_1$ has detected a bar code or not according to whether a read signal has been received from the reader $14_1$ or not, and when a result of determination is "No", the CPU $11_1$ repeats this determination.

Herein, the operator reads the discrete setting bar code 200 (Refer to FIG. 2) with the help of the reader $14_1$ of the scanner $10_1$. Information corresponding to contents of setting to be changed is represented on this discrete setting bar code 200. With this feature, the reader $14_1$ detects the discrete setting bar code 200, and the CPU $11_1$ of the scanner $10_1$ recognizes a result of determination in step SC1 as "Yes" and shifts the system control to step SC2. Furthermore, a read signal corresponding to the discrete setting bar code 200 is inputted from the reader $14_1$ to the CPU $11_1$.

In step SC2, the CPU $11_1$ of the scanner $10_1$ demodulates the bar code from the received read signal, and determines whether the bar code detected in step SC1 is the discrete setting bar code 200 or not. In this case, as the detected bar code is the discrete setting bar code 200, the CPU $11_1$ of the scanner $10_1$ recognizes a result of determination in step SC2 as "Yes" and shifts the system control to step SC3. In step SC3, the CPU $11_1$ of the scanner $10_1$ reads the existing setting from the non-volatile memory $18_1$, updates the existing setting with the new setting obtained from the read signal, and returns the system control to step SC1. When the other setting is to be changed in the step and thereafter, the operator performs the operation of reading the other discrete setting bar code 200 with the help of the reader $14_1$.

Then, the operator performs an operation, when the operation of reading the discrete setting bar code 200 is finished, for having the discrete/end of batch setting mode bar code 300 read with the reader $14_1$ of the scanner $10_1$ in order to terminate the discrete/batch setting mode. The reader $14_1$ detects the discrete/end of batch setting mode bar code 300, and the CPU $11_1$ of the scanner $10_1$ recognizes the result of determination in step SC1 as "Yes" and shifts the system control to step SC2. A read signal corresponding to the discrete/end of batch setting mode bar code 300 is inputted from the reader $14_1$ to the CPU $11_1$.

In step SC2, the CPU $11_1$ of the scanner $10_1$ demodulates the bar code from the received read signal, and determines whether the bar code detected in step SC1 is the discrete setting bar code 200 or not. In this case, as the detected bar code is the discrete/end of batch setting mode bar code 300, the CPU $11_1$ of the scanner $10_1$ recognizes the result of determination in step SC2 as "No" and shifts the system control to step SC4. In step SC4, the CPU $11_1$ of the scanner $10_1$ determines whether the bar code detected in step SC1 is the first batch setting bar code 500 or not. In this case, as the detected bar code is the discrete/end of batch setting mode bar code 300, the CPU $11_1$ of the scanner $10_1$ recognizes the result of determination in step SC4 as "No" and shifts the system control to step SC6.

In step SC6, the CPU $11_1$ of the scanner $10_1$ determines whether the bar code detected in step SC1 is the second batch setting bar code 600 or not. In this case, as the detected bar code is the discrete/end of batch setting mode bar code 300, the CPU $11_1$ recognizes the result of determination as "No" and shifts the system control to step SC8. In step SC8, the CPU $11_1$ of the scanner $10_1$ determines whether the bar code detected in step SC1 is the discrete/end of batch setting mode bar code 300 or not, and when a result of determination is "No", system control returns to step SC1. In this case, as the discrete/end of batch setting mode bar code 300 has been detected, the CPU $11_1$ of the scanner $10_1$ recognizes the result of determination in step SC8 as "Yes" and shifts the system control to step SC9. With this operation, the mode in the scanner $10_1$ is shifted from the discrete setting mode to the operating mode.

In step SC9, the CPU $11_1$ of the scanner $10_1$ updates the setting in the non-volatile memory $18_1$ with the new setting according to the updating operation in step. SC3, ends the discrete/batch set processing, and returns to step SB1 (Refer to FIG. 3). With this operation, the operation of discrete changing of setting in the scanner $10_1$ using the discrete setting bar code 200 is finished.

Next, description is made for batch setting to be performed with respect to the other scanners $10_2$ to $10_n$ according to discrete setting in the scanner $10_1$ of the above mentioned discrete/batch setting. In the batch setting mode of the discrete/batch setting mode described later, the discrete/shift to batch setting mode bar code 100 and the first batch setting bar code 500 (or the second batch setting bar code 600) each shown in FIG. 2 are used. Namely, the batch setting mode in the POS system according to one embodiment includes two types of modes: a mode using the first batch setting bar code 500 and the other mode using the second batch setting bar code 600.

At first, description is made for the batch setting mode using the first batch setting bar code 500. In this case, it is assumed that the setting in the scanner $10_1$ has already been performed separately by using the discrete setting bar code 200 and the setting in the non-volatile memory $18_1$ of the scanner $10_1$ has already been updated. In this status, when a command is inputted from the input section 40 so as to request the transmission of changes in the setting stored in the non-volatile memory $18_1$, then the host computer 30 transmits a first transmission request command $S_1$ to the CPU $11_1$ via the POS terminal $20_1$, the cable $L_1$, and the external interface $17_1$.

Figure 3:
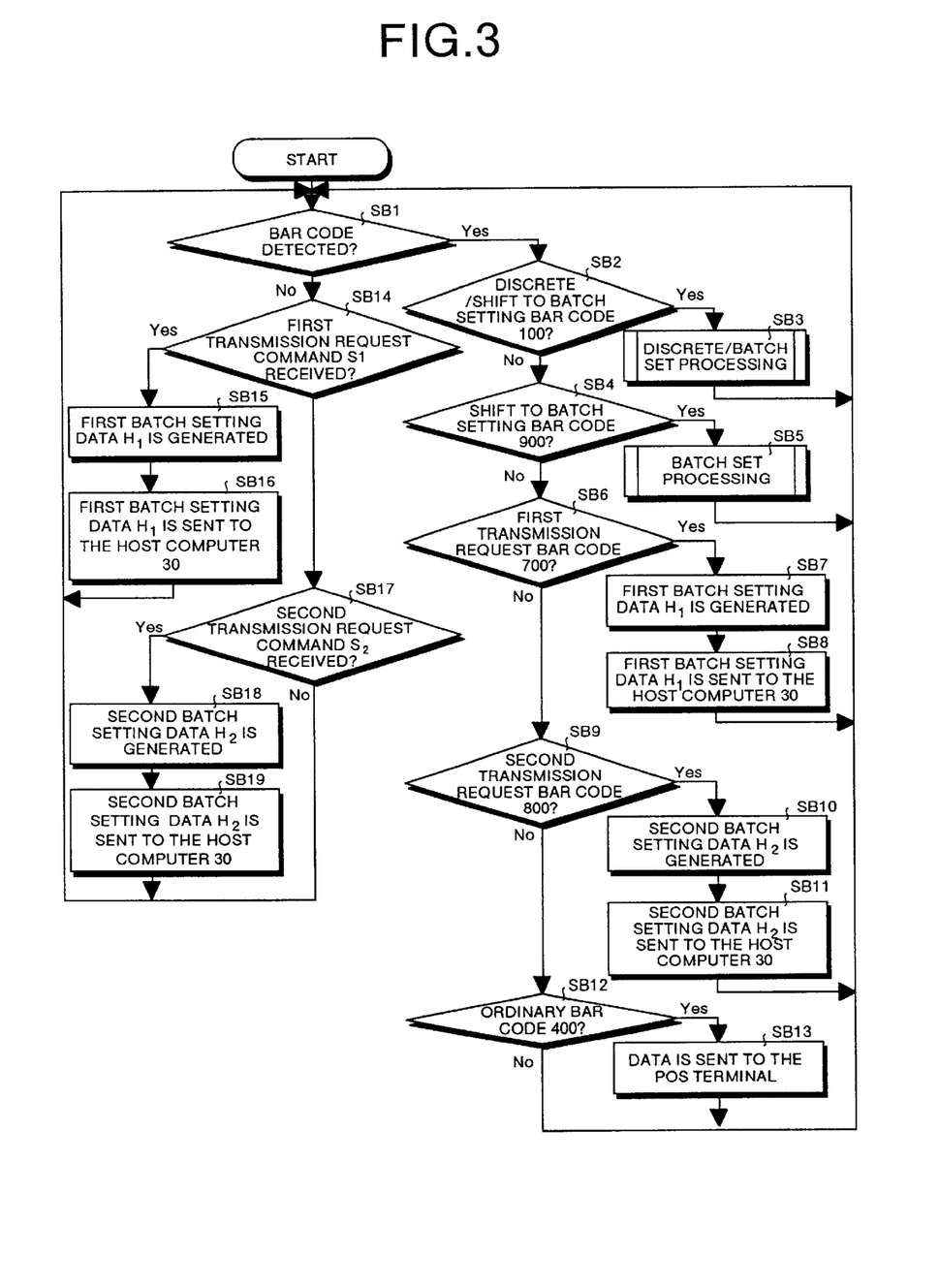
FIG. 3 is a flow chart for explaining a complete operation of the POS system according to one embodiment.

Then, when receiving the first transmission request command $S_1$, the CPU $11_1$ recognizes the result of determination in step SB14 shown in FIG. 3 as "Yes" and shifts the system control to step SB15. In step SB15, the CPU $11_1$ reads the changes in all of settings from the non-volatile memory $18_1$, generates the data as a first batch setting data $H_1$, and shifts the system control to step SB16. In step SB16, the CPU $11_1$ outputs the first batch setting data H, to the host computer 30 via the external interface $17_1$, the cable $L_1$, and the POS terminal $20_1$. After this the system control is returned to step SB1.

Then, when receiving the first batch setting data $H_1$, the host computer 30 outputs print data for the first batch setting bar code 500 to the printer 50 according to the first batch setting data $H_1$. With this operation, the first batch setting bar code 500 (Refer to FIG. 2) is printed on a label not shown. Herein, the first batch setting bar code 500 is obtained by converting to bar code the information (all the settings in the non-volatile memory 18$_1$) corresponding to the first batch setting data H$_1$.

When printing of the first batch setting bar code 500 is complete, the operator performs an operation for a batch setting mode using the first batch setting bar code 500 with respect to the scanners 10$_2$ to 10$_n$ which are the scanners other than the scanner 10$_1$. More specifically, the operator reads the discrete/shift to batch setting mode bar code 100 (Refer to FIG. 2) with the help of the reader 14$_2$ of the scanner 10$_2$ in order to shift the mode. The CPU 11$_2$ of the scanner 10$_2$ recognizes the results of determination in steps SB1 and SB2 shown in FIG. 3 as "Yes" and the system control is shifted to step SB3 where the discrete/batch set processing shown in FIG. 4 is executed.

Figure 4:
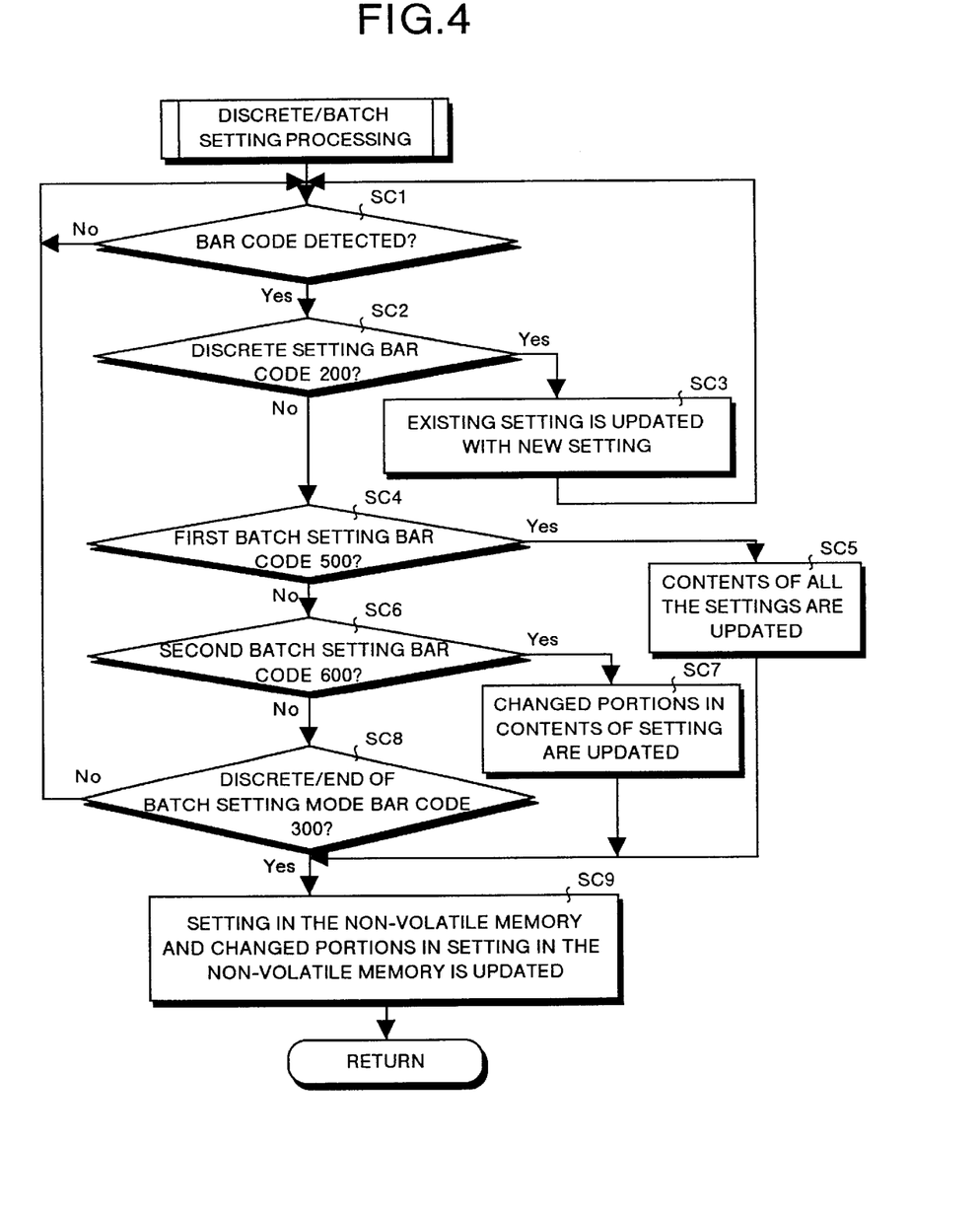
FIG. 4 is a flow chart for explaining discrete/batch set processing in the POS system according to one embodiment.

Namely, the CPU 11$_2$ of the scanner 10$_2$ determines in step SC1 shown in FIG. 4 whether the reader 14$_2$ has detected a bar code or not. Herein, the operator reads the first batch setting bar code 500 prepared with the above operation with the help of the reader 14$_2$ of the scanner 10$_2$. The CPU 11$_2$ of the scanner 10$_2$ then recognizes the result of determination in step SC1 as "Yes" and also recognizes the result of determination in step SC2 as "Now" and shifts the system control to step SC4. In step SC4, as the first batch setting bar code 500 has been detected, the CPU 11$_2$ of the scanner 10$_2$ recognizes the result of determination as "Yes" and shifts the system control to step SC5.

In step SC5, the CPU 11$_2$ of the scanner 10$_2$ reads all the settings in the non-volatile memory 18$_2$ according to a read signal (first batch setting data H$_1$) of the first batch setting bar code 500, updates all the settings with the new setting (setting in the non-volatile memory 18$_1$ of the scanner 10$_1$), and shifts the system control to step SC9. Instep SC9, the CPU 11$_2$ of the scanner 10$_2$ updates the settings in the non-volatile memory 18$_2$, and ends the discrete/batch set processing. After this the system control is returned to step SB1 shown in FIG. 3.

Namely, in step SC9, the data for contents of setting in the non-volatile memory 18$_1$ of the scanner 10$_1$ is copied to the non-volatile memory 18$_2$ of the scanner 10$_2$ from the first batch setting bar code 500. Then, when the setting in the scanner 10$_2$ is complete, the operator successively performs the same operation as the batch setting operation for the scanner 10$_2$ using the same first batch setting bar code 500 in order to change the setting in the scanners 10$_3$ to 10$_n$.

The batch setting using the second batch setting bar code 600 (Refer to FIG. 2) instead of the first batch setting bar code 500 will be explained below. In this case, it is assumed that discrete setting in the scanner 10$_1$ has been performed by using the discrete setting bar code 200 and the setting in the non-volatile memory 18$_1$ of the scanner 10$_1$ has already been updated.

In this status, when a command is inputted from the input section 40 so as to request the transmission of changes in the setting stored in the non-volatile memory 18$_1$, then the host computer 30 transmits a first transmission request command S$_2$ to the CPU 11$_1$ via the POS terminal 20$_1$, the cable L$_1$, and the external interface 171.

Then, when receiving the second transmission request command S$_2$, the CPU 11$_1$ recognizes the result of determination in step SB17 shown in FIG. 3 as "Yes" and shifts the system control to step SB18. In step SB18, the CPU 11$_1$ after reading the setting from the non-volatile memory 18$_1$, compares these setting with the setting before change and generates adata for the changes. Then, the CPU 11$_1$ generates the data for the changed portion as a second batch setting data H$_2$, and shifts the system control to step SB19. In step SB19, the CPU 11$_1$ outputs the second batch setting data H$_2$ to the host computer 30 via the external interface 17$_1$, the cable L$_1$, and the POS terminal 20$_1$. After this the system control is returned to step SB1.

Then, when receiving the second batch setting data H$_2$, the host computer 30 outputs print data for the second batch setting bar code 600 to the printer 50 according to the second batch setting data H$_2$. With this operation, the second batch setting bar code 600 is printed on a label not shown. Herein, the second batch setting bar code 600 is obtained by converting to bar code the information (changes in the setting in the non-volatile memory 18$_1$) corresponding to the second batch setting data H$_2$.

When printing of the second batch setting bar code 600 is complete, the operator performs an operation for a batch setting mode using the second batch setting bar code 600 with respect to the scanners 10$_2$ to 10$_n$ which are other than the scanner 10$_1$. More specifically, the operator reads the discrete/shift to batch setting mode bar code 100 (Refer to FIG. 2) with the help of the reader 14$_2$ of the scanner 10$_2$ in order to shift the mode. The CPU 11$_2$ of the scanner 10$_2$ recognizes the results of determination in steps SB1 and SB2 shown in FIG. 3 as "Yes" and the system control is shifted to step SB3 where the discrete/batch set processing shown in FIG. 4 is executed.

Herein, when the second batch setting bar code 600 is read using the reader 14$_2$, then the CPU 11$_2$ of the scanner 10$_2$ recognizes the result of determination in step SC1 shown in FIG. 4 as "Yes" and also recognizes the results of determination in steps SC2 and SC4 as "No" and shifts the system control to step SC6. In step SC6, as the second batch setting bar code 600 has been detected, the CPU 11$_2$ of the scanner 10$_2$ recognizes a result of determination as "Yes" and the system control shifts to step SC7.

In step SC7, the CPU 11$_2$ of the scanner 10$_2$ reads the setting from the non-volatile memory 18$_2$ according to a read signal (second batch setting data H$_2$) of the second batch setting bar code 600, updates a portion corresponding to the changes in the setting obtained from the second batch setting data H$_2$ and then shifts the system control to step SC9. In step SC9, the CPU 11$_2$ of the scanner 10$_2$ updates the changed portion in the setting in the non-volatile memory 18$_2$, and ends the discrete/batch set processing. After this the system control is returned to step SB1 shown in FIG. 3.

When the setting in the scanner 10$_2$ is changed, the operator successively performs the same operation as the batch setting operation performed for the scanner 10$_2$ using the same second batch setting bar code 600 in order to change setting in the scanners 10$_3$ to 10$_n$.

In the above mentioned POS system according to one embodiment, although description has been made for the case where the first batch setting data H$_1$ and second batch setting data H$_2$ are transmitted after inputting a command through the input section 40, it is also possible to use the first transmission request bar code 700 and second transmission request bar code 800 (Refer to FIG. 2) in place of entering a command as mentioned above.

Namely, in place of entering a command, when the operator reads the first transmission request bar code 700 with the help of the reader 14$_1$ of the scanner 10$_1$, then the CPU 11$_1$ of the scanner 10$_1$ recognizes the result of determination in step SB6 shown in FIG. 3 as "Yes" and shifts the system control to step SB7. In step SB7, the CPU 11$_1$ of the scanner 10$_1$ generates the first batch setting data H$_1$ in the same manner as the step SB15 described above and shifts the system control to step SB8. In step SB8, the CPU $11_1$ of the scanner $10_1$ transmits the first batch setting data $H_1$ to the host computer 30 via the external interface $17_1$, the cable $L_1$, and the POS terminal $20_1$ in the same manner as the step SB16.

On the other hand, in place of entering a command, when the operator reads the first transmission request bar code 800 with the help of the reader $14_1$ of the scanner $10_1$, then the CPU $11_1$ of the scanner $10_1$ recognizes the result of determination in step SB9 shown in FIG. 3 as "Yes" and shifts the system control to step SB10. In step SB10, the CPU $11_1$ of the scanner $10_1$ generates the second batch setting data $H_2$ in the same manner as the step SB18 described above and shifts the system control to step SB11. In step SB11, the CPU $11_1$ of the scanner $10_1$ transmits the second batch setting data $H_2$ to the host computer 30 via the external interface $17_1$, the cable $L_1$, and the POS terminal $20_1$ in the same manner as the step SB19.

(Batch Set Mode)

In the above mentioned POS system according to one embodiment, although description has been made for the case where batch setting is performed to the scanners $10_1$ to $10_n$ using the discrete/shift to batch setting mode bar code 100, it is also possible to perform batch setting using the shift to batch setting mode bar code 900 in place of the discrete/shift to batch setting mode bar code 100. Description is made hereinafter for a batch setting mode when the shift to batch setting mode bar code 900 is used.

In this case, it is assumed that discrete setting in the non-volatile memory $18_1$ of the scanner $10_1$ has already been completed as described above and the first batch setting bar code 500 or the second batch setting bar code 600 is printed by the printer 50. In this status, when the batch setting using the first batch setting bar code 500 (or the second batch setting bar code 600) is to be performed with respect to each of the non-volatile memory $18_2$ of the scanner $10_2$, the operator reads the shift to batch setting mode bar code 100 with the help of the reader $14_2$ of the scanner $10_2$.

Figure 5:
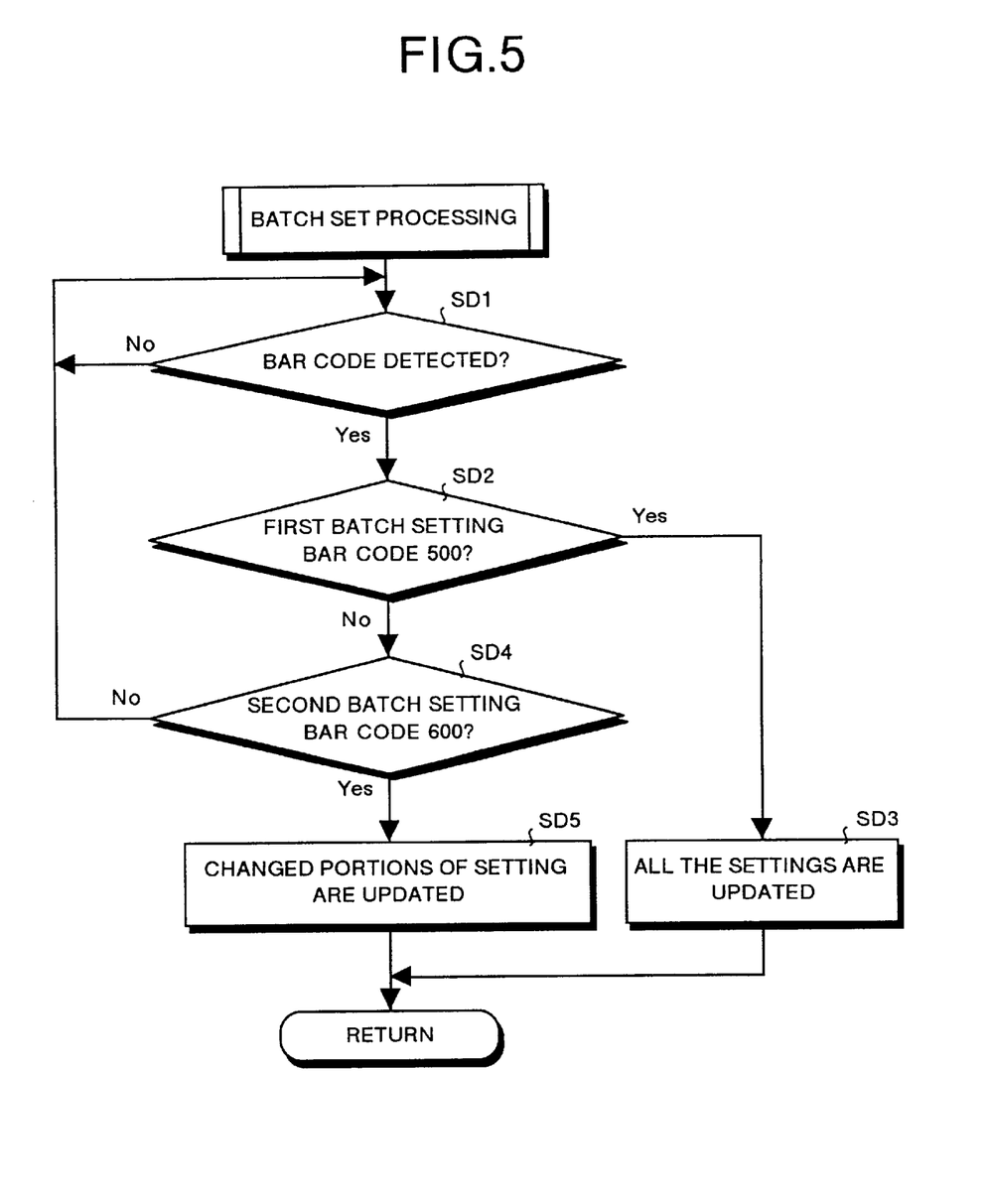
FIG. 5 is a flow chart for explaining batch set processing in the POS system according to one embodiment.

With this operation, the CPU $11_2$ of the scanner $10_2$ recognizes the result of determination in step SB4 shown in FIG. 3 as "Yes" and shifts the system control to step SB5 where the batch set processing shown in FIG. 5 is executed. Namely, in step SD1 shown in FIG. 5, the CPU $11_2$ of the scanner $10_2$ determines whether the reader $14_2$ has detected a bar code or not, and repeats the same determination when the result of determination is "No". When the reader $14_2$ has read the first batch setting bar code 500 through operation by the operator, the CPU $11_2$ of the scanner $10_2$ recognizes the result of determination in step SD1 as "Yes" and shifts the system control to step SD2.

In step SD2, the CPU $11_2$ of the scanner $10_2$ determines whether the first batch setting bar code 500 has been detected or not. In this case, as the first batch setting bar code 500 has been detected, the CPU $11_2$ recognizes a result of detection as "Yes" and shifts to step SD3. In step SD3, the CPU $11_2$ of the scanner $10_2$ updates the contents of all the settings in the non-volatile memory $18_2$ to contents of new setting (contents of setting in the non-volatile memory $18_1$ of the scanner $10_1$) according to demodulated bar code from the read signal of the first batch setting bar code 500 with system control returned to step SB1 (Refer to FIG. 3) and repeats the sequence of operations described above.

On the other hand, when batch setting using the second batch setting bar code 600 is to be performed with respect to each of non-volatile memories of the scanners $10_2$ to $10_n$, the operator reads the shift to batch setting mode bar code 900 with the help of the reader $14_2$ of the scanner $10_2$, then and reads the second batch setting bar code 600. The CPU $11_2$ of the scanner $10_2$ recognizes, by performing the same operation described above, the result of determination in step SB4 shown in FIG. 3 as "Yes" and the system control is shifted to step SB5 where the batch set processing shown in FIG. 5 is executed.

Namely, in the batch set processing shown in FIG. 5, the CPU $11_2$ of the scanner $10_2$ recognizes the result of determination in step SD1 as "Yes", also recognizes the result of determination in step SD2 as "No" and further recognizes the result of determination in step SD4 as "Yes", and shifts the system control to step SD5. In step SD5, the CPU $11_2$ of the scanner $10_2$ updates the changed portion of setting in the non-volatile memory $18_2$ according to the demodulated bar code from the read signal of the second batch setting bar code 600. After this the system control is returned to step SB1 shown in FIG. 3.

As described above, with the POS system according to one embodiment, setting in the scanner $10_1$ is discretely changed, and the setting in other scanners $10_2$ to $10_n$ is changed in batch using the same first batch setting bar code 500 (or the second batch setting bar code 600). Therefore, a setting operation can speedily be performed as compared to that of the conventional type of POS system, and as there is no need to discretely change the setting in each of the scanners $10_1$ to $10_n$ using a DIP switch or the like, incorrect setting can be prevented, which allows the changing operation of setting to accurately be performed. Furthermore, with the POS system according to one embodiment, when the second batch setting bar code 600 is used, only a changed portion of data may be read, so that a time for reading can be reduced, which allows the changing operation of setting to further speedily be performed as compared to that of the conventional type of POS system.

In addition, with the POS system according to one embodiment, as there is used an extremely simple method of reading the first transmission request bar code 700 or the second transmission request bar code 800 using a reader, changing operation of setting can further speedily be performed as compared to that of the conventional type of POS system.

In the POS system according to one embodiment described above, although description has been made for the case where a mode in, for instance, the scanner $10_2$ is shifted to the batch setting mode by reading the shift to batch setting mode bar code 900 (discrete/shift to batch setting shift bar code 100) with the help of the reader $14_2$ of the scanner $10_2$, the mode may be shifted to the batch setting mode using the DIP switch $19_2$ of the scanner $10_2$ in place of the shift to batch setting mode bar code 900 (discrete/shift to batch setting bar code 100). In one embodiment described above, although the POS system has been taken up as an example for description, the invention is not limited to the POS system, and the represented configuration is applicable as an optical reader for optically reading a bar code and a physical distribution system for processing information using bar code in, for instance, physical distribution.

As described above, in the present invention, data for setting in one of scanners is discretely changed and then data for setting in the other scanners is changed in batch. Therefore, the setting can speedily be changed as compared to that of the conventional type of POS system, and chances of incorrect setting can be prevented because there is no need to discretely change the setting, especially, in a plurality of scanners using a DIP switch or the like, which allows the setting to accurately be changed.

In the present invention, because an extremely simple method of having the reader read a specified bar code is used, the setting can more speedily be changed as compared to that of the conventional type of POS system.

In the present invention, when discretely changing the setting in one f scanners, data in the memory for setting before changes is compared with the data for setting after cha ges, and a batch setting bar code is generated according to only the different portions of the data. Therefore, because only changed portions of data is required to be read, the time for reading when batch setting bar code is read by each reader of the other scanners is reduced, which allows the setting to more speedily be changed as compared to that of the conventional type of POS system.

In the present invention, as data for setting in the memory can be sent to the external device, the external device can easily change the setting in the memories of the other scanners in batch using the received data for setting.

In the present invention, as only data for setting set anew is sent via the interface to the external device by the control unit, amount of data required for setting in the memories of the other scanners by the external device becomes smaller, which allows the setting to speedily be changed.

In the present invention, as data for setting in other scanners can be updated in batch using the batch setting bar code, the setting can speedily and accurately be changed.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A POS system comprising:

a plurality of scanners each having a reader for optically reading a bar code, a memory for storing therein data for setting required for operations, and a control unit for controlling the operation of writing data in or reading data from said memory;

a discrete setting changing unit for changing the data for setting in said memory in one of the plurality of scanners; and a bar code generating unit for generating a batch setting bar code according to the data for setting in said memory in the scanner whose data for setting has been changed;

wherein said control unit in each of the scanners other than the scanner whose data for setting has been changed, changes the data for setting in its said memory according to the data for setting obtained from the batch setting bar code read by the reader of the respective scanners.

2. A POS system according to claim 1; wherein the bar code generating unit comprises:

a read control unit for issuing an instruction to read the data for setting from said memory with respect to said control unit of the scanner whose data for setting has been changed; and a bar code generator for generating the batch setting bar code according to the data for setting read by said control unit of the scanner whose data for setting has been changed.

3. A POS system according to claim 1; wherein the control unit of said scanner whose data for setting has been changed reads the data for setting from said memory according to a result of reading a specified bar code with said reader; and said bar code generating unit generates the batch setting bar code according to the data for setting.

4. A POS system comprising:

a plurality of scanners each having a reader for optically reading a bar code, a memory for storing therein data for setting required for operations, and a control unit for controlling the operation of writing data in or reading data from said memory;

a discrete setting changing unit for changing the data for setting in said memory in one of the plurality of scanners; and a bar code generating unit for comparing the data for setting before changes in said memory of said scanner whose data for setting has been changed to the data for setting and generating a batch setting bar code according to only the changed portions of the data;

wherein said control unit in each of said scanners other than the scanner whose data for setting has been changed, changes only the changed portions of the data for setting stored therein according to data for the changed portions obtained from the batch setting bar code read by the readers of the respective scanners.

5. A POS system comprising: a plurality of scanners each having a reader for optically reading a bar code, a memory for storing therein data for setting required for operations, and a control unit for controlling the operation of writing data in or reading data from said memory;

a discrete setting changing unit for changing the data for setting in said memory in one of the plurality of scanners; and a bar code generating unit for generating a batch setting bar code according to the data for setting in said memory in said scanner whose data for setting has been changed;

wherein said control unit in each of the scanners other than the scanner whose data for setting has been changed, changes the data for setting stored in said memory according to the data for setting obtained from the batch setting bar code read by the reader of the respective scanners.

6. A POS system comprising:

a plurality of scanners each having a reader for optically reading bar code, a memory for storing therein data for setting required for operations, and a control unit for controlling the operation of writing data in or reading data from said memory;

a discrete setting changing unit for changing the data for setting in said memory in one of the plurality of scanners; a bar code generating unit for generating a batch setting bar code according to the data for setting in said memory in the scanner whose data for setting has been changed: and a switch for shifting the operating mode of the scanners other than the scanner whose data for setting has been changed to a batch setting mode:

wherein said control unit in each of the scanners other than the scanner whose data for setting has been changed, shifts the mode to the batch setting mode under control by said switch and changes the data for setting in said memory according to the data for setting obtained from the batch setting bar code read by the reader of the respective scanners.

* * * * *